Feb. 18, 1969  I. LANDSMAN ET AL  3,428,221
INSECTICIDAL TAPES AND METHODS OF USING THE SAME
Filed Jan. 3, 1967
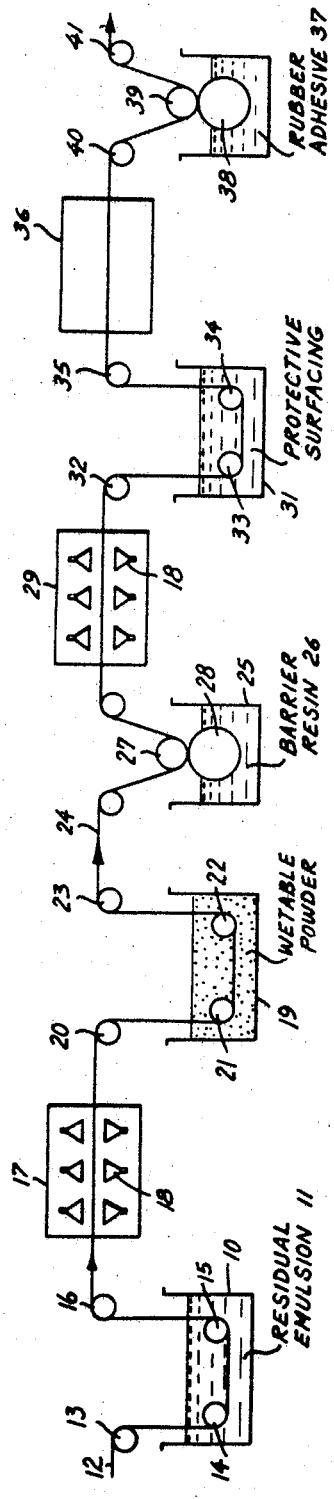
FIG. 1
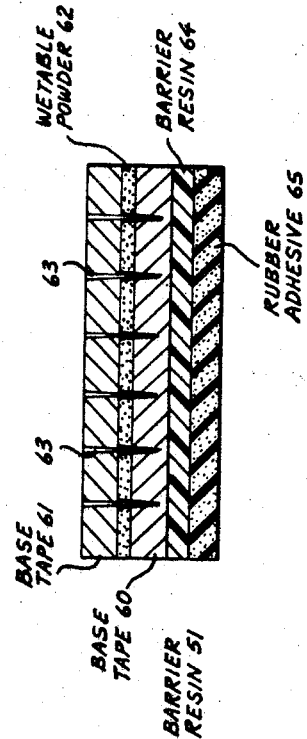
FIG. 3
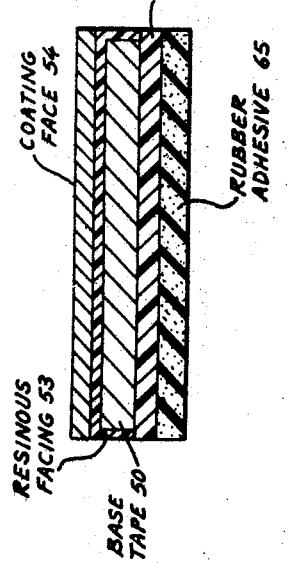
FIG. 2
INVENTORS
IRVING LANDSMAN
EMANUEL LANDSMAN
BY 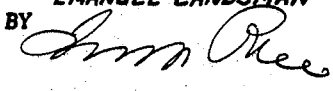
ATTORNEY

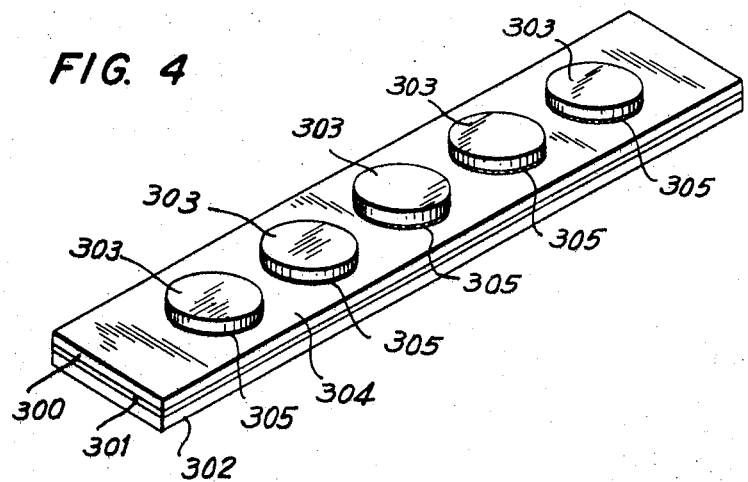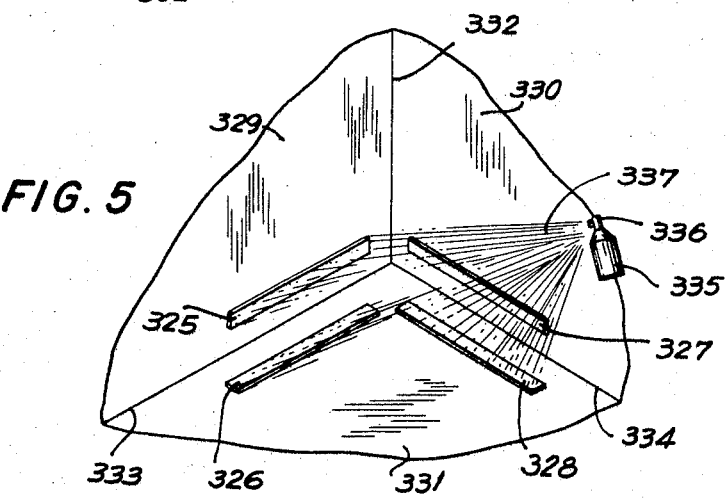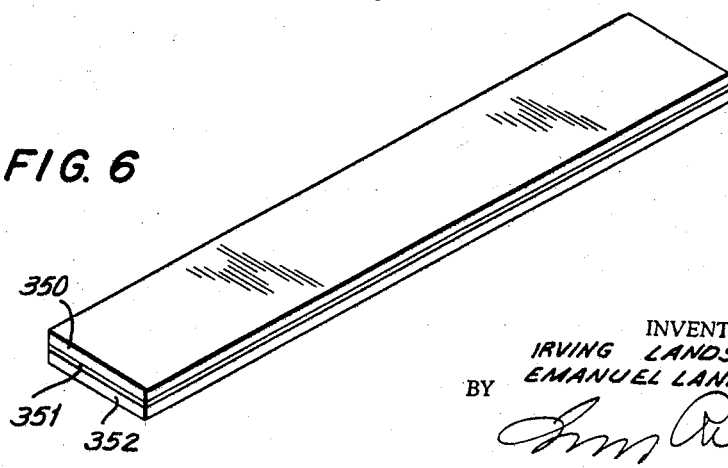

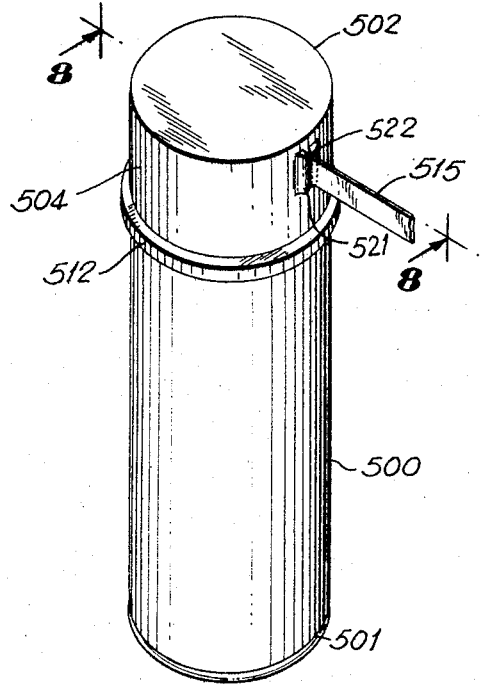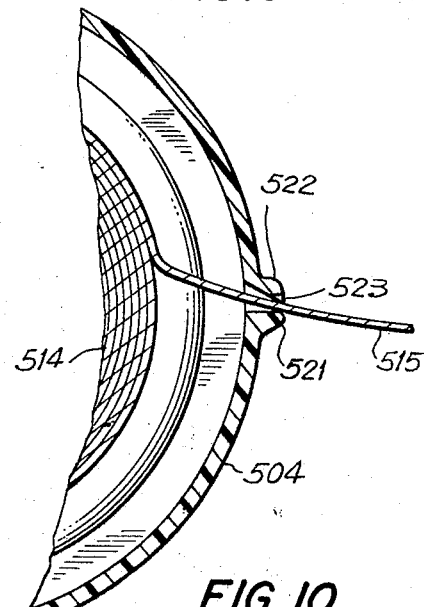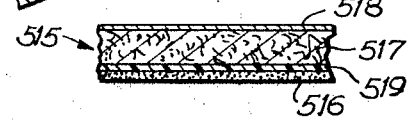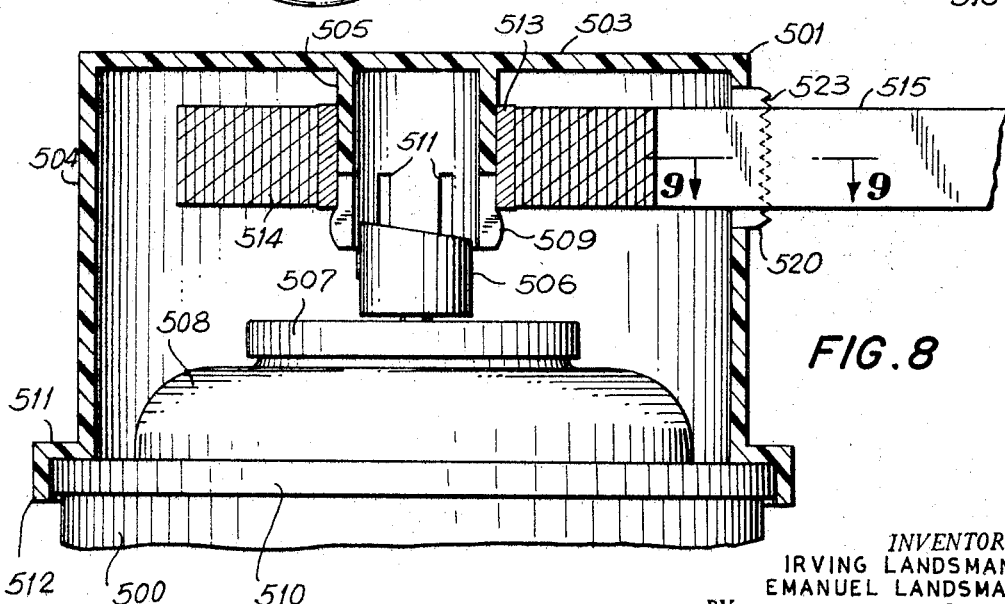

United States Patent Office 3,428,221
Patented Feb. 18, 1969

3,428,221
INSECTICIDAL TAPES AND METHODS OF USING THE SAME
Irving Landsman, 3530 Henry Hudson Parkway E., and Emanuel Landsman, 2727 Palisade Ave., both of Bronx, N.Y. 10463
Filed Jan. 3, 1967, Ser. No. 607,033
U.S. Cl. 222—182    5 Claims
Int. Cl. B65d *83/14;* B26f *3/02*

ABSTRACT OF THE DISCLOSURE

The present disclosure sets forth an absorbent tape carrying a pressure sensitive covering which may be applied to shelving around baseboards, sinks, floors and basements and other places of entry for insects which will carry or to which has been applied a liquid dispersion of a residual insecticide.

The absorbent material, which may desirably consist of matted or less desirably woven or other fibrous material, will be designed to absorb and store up the residual insecticidal material for long periods of time; for example, for a week to several months or longer. The tape may be removed from the container and then cut at intervals by the person applying the tape, so that it will fit the area and length of flooring or shelving desired. The spray can may then be used to spray the tape with the specific insecticide having the residual effect.

The tape if woven has readily frangible or breakable warp threads or threads extending longitudinally of the tape, so that it can be readily cut or ruptured without an additional cutting instrument by the edge of the holder or by saw teeth molded into the cap. Where the absorbent material consists of matted fibers or felted material which is readily breakable or shearable, there may be applied between such matted or breakable material and the pressure sensitive adhesive coating a readily breakable plastic or paper strip material.

The association of the tape with the spray can is desirably accomplished by inserting the coiled tape in the cap of the spray can, with the cap being desirably molded of plastic and having a slot with a serrated cutter edge so as to break the tape in desired lengths. The tape may also be mounted on the side of the can or otherwise clipped onto the can so that the housewife or other applicator may first clip the tape and then spray the tape with the insecticidal composition.

CROSS-REFERENCES TO RELATED APPLICATIONS

The present application relates to the subject matter of applications Ser. No. 490,348, filed Sept. 27, 1965, and Ser. No. 264,215, filed Mar. 11, 1963, and now abandoned. The former application will mature into Patent No. 3,295,246 on Jan. 3, 1967.

The present application is particularly directed to dispensing of the tape with application of the residual insecticidal spray thereto after placement of the tape upon a suitable area or surface, although association of the tape with the spray can and the readily breakable structure of the tape are also important features of the present invention.

BACKGROUND OF INVENTION

Field of invention

The present invention relates to insecticidal materials and methods of applying the same, and is generally classified in Class 167, Sub-class 42.

Description of the prior art

Previous attempts to prepare such materials have not been particularly satisfactory. For example, in British Patent, No. 577,124, accepted May 6, 1946, Norman Ernest Hickin, a strip of paper or flexible material was used, coated on one side with a pressure sensitive adhesive and having on the other side a substance or preparation toxic to insects. Due to the lack of absorption in the strip and the nondurability and nonresidual character of the material used, these strips proved ineffective and merely added something to the room which in itself collected dirt and dust and did not aid in insecticidal purposes.

In the Clarke Patent, No. 2,720,013, there were carriers affixed to the blades of the fan, but the material was not durable or effective over a long period of time, as a properly prepared absorbent tape would be.

Other prior attempts which also were not satisfactory were embodied in patents: No. 1,161,537, J. W. See, patented Nov. 23, 1915; No. 2,139,225, Re. 21,791, N. P. Easling, reissued May 6, 1941; No. 2,087,164, A. D. Purifoy, patented July 13, 1937; No. 2,911,756, R. J. Geary, patented Nov. 10, 1959; No. 2,808,679, R. E. Collins, patented Oct. 8, 1957; No. 1,455,463, I. J. Weinberg, patented May 15, 1923.

BRIEF SUMMARY AND GENERAL STATEMENT OF INVENTION

It has been found most satisfactory according to a preferred embodiment of the present invention to provide an absorbent strip base material desirably of felted material which has not been compressed or calendered.

This absorbent strip has a loose matted fiber construction so that it can absorb at least 70 to 75% of its weight in water, which felt in dry condition after application is then thoroughly saturated with an oily liquid insecticidal residual material in emulsion form so that there is a thorough penetration in and through the pores of the absorbent material of the oil residual which upon removal of the water will remain effectively in position.

This absorbent tape material, which may vary from ¼ inch to 1 inch in width and from 5 to $20/1,000$ of an inch in thickness and which may desirably be of loose felted paper base, is then covered on one of its sides with an impervious coating or protective strip which will prevent removal on that side of any of the residual which has been saturated and dried into the matted fiber of the tape.

To this same side is applied a pressure sensitive adhesive coating of synthetic or natural rubber and will be applied in a thickness not exceeding $1/10$ to $1/20$ of the thickness of the absorbent paper material.

The tape may then be desirably coated with a light coating of a resinous material which will permit a slow seepage or evaporation of the residual oil but not any substantial evaporation or removal thereof. Desirably, the coating on the top and side edges of the tape should be such that it will penetrate partly into the tape and leave the rough absorbent surface exposed.

Desirably, the tape is carried on or is a single package with the spray can which carries the insecticidal solution or application. The plastic cap for example which may cover the spray can may have a central hollow cylindrical spindle depending therein with snap tits or snap wedges along the lower edge thereof to permit a spool of tape to be forced into position and held there permanently.

The side of the cap may have a slot through which the tape may be projected together with a saw tooth cutter molded integrally with the skirt of the cap so that the tape will be cut off into appropriate lengths by the houswife or other person applying the tape and carry on the extermination procedure.

If desired, the entire side of the can may be provided with an outer cylindrical holder with appropriate slots with a series of tapes held therein with appropriate slots and cutter edges, or the can may be so squat or of such controlled height that the tape will be as wide as the height of the can, in which case the tape will be carried in an outer annular container.

The tape package may otherwise be suitably clipped or otherwise held onto the side of the can so that both will be readily available. Furthermore, the bottom of the can may be cupper or recessed in such a way that the tape may be held therein and project through a slot from the side or bottom of the can where there is no likelihood of escape of any of the liquid contents.

The preferred residual insecticidal materials are used in the form of 3 to 10% emulsions and include Diazinon (Geigy Agricultural Chemicals), Korlan (The Dow Chemical Company), Chlordane, Lindane, Malathion, Dieldrin (The Dow Chemical Company), Dicapthon and Korlan.

In connection with the above type of compounds, the following may be utilized:

Chlordane is an octachloro methano tetrahydroindane and is used as a colorless liquid which is emulsified in amounts of 3 to 5% in water for the purpose of saturation on the tape.

Dieldrin is a hexachloro epoxy octahydro dimethanonaphthalene. Korlan is a dimethyl trichlorophenyl phosphorothioate.

Desirably these compounds are sprayed upon the absorbent tape in emulsified condition. The tape will take up between 3 to 10% of the oily residual after the water or liquid carrier has been dried therefrom.

In the form of the invention where the tape is pretreated the absorbent tape is passed through the emulsion and then is dried in a drier oven between 150° and 180° F.

If desirable, instead of applying a water emulsion, the residual may be dissolved in an alternative substance, for example of a volatile hydrocarbon and then such volatile hydrocarbon may be removed by evaporation under heat. However, the water emulsion application with slow drying is preferred.

If desired, 5 to 10% of a heavy oil, desirably a hydrocarbon oil or even a wax, may be utilized to cause retention of the residual on the matted material of the tape after it has been saturated thereon. Nonresidual materials such as pyrethrum are not employed although they may be used for drying purposes.

In this procedure, the tape, after it has been treated with or passed through the 3 to 10% emulsion of the residual with full saturation and after part drying or after full drying or at room temperature or under a temperature of 150° to 180° F., may be passed through a powdered material such as pyrethrum to dry the tape.

Preferably, the tape, if it is to be surface dried by a powder, is passed through a saturable powder mixture which is desirably of the nature of talcum powder containing from 1 to 5% of a residual or a nonresidual insecticidal powder.

After the drying of the tape, it is possible to apply to the upper surface thereof a thin layer of a wettable powder which may be in addition to a saturable powder already applied in the drying operation. The surface of this tape may be combined with a second lamination or tape upon which there has been absorbed or saturated the emulsion of the residual insecticidal material.

These two tapes of absorbent felted material, both saturated and in relatively dry condition, with the residual emulsion, and with the base tape carrying a wettable-powder, may then be combined with pressure or by close perforation, which will result in small holes being formed throughout the entire tape construction with the wettable powder being capable of passing onto the upper surface of the upper tape or lamination.

In a less preferred condition, the upper tape lamination may be left free of the residual or insecticidal material so that the only effective application on the top surface of the upper tape will be such insecticide that seeps through the closely spaced perforations.

These perforations are desirably spaced between $1/128$ to $1/64$ of an inch apart over the entire surface and penetrate through both layers of the paper and form openings of hygroscopic size through which a slow release of the residual is achieved.

After the tape has been formed, it is roller coated on its lower face by a suitable resinous material which will prevent any escape of residual or insecticidal material from its lower face. This may be done by roller coating or by spraying.

The preferred resinous material which may be found to act as barriers are epoxy resins and phenol formaldehyde resins which are a flexible composition and which are applied in a thickness of about $1/10$ to $1/2$ inch in thickness of the paper material.

The tape is then passed through a light resinous solution desirably such as vinyl resin or polyethylene resin or even nylon which will merely form a surfacing without forming a substantial coating layer on the top face and side edges of the paper tape or other absorbent material.

As a final operation, the underside which has been provided with a barrier is coated with the rubber synthetic or natural rubber pressure sensitive adhesive coating.

This pressure sensitive adhesive coating may consist of a single layer of a liquid composition five parts by way of rubber, to parts by way of a natural or synthetic resin such as rosin or cumarone resin in which may be employed in dispersion a finely divided dry inert powder such as whiting or zinc oxide in the amount of one-half to one part by weight.

This tape may be rolled up and later on used in rolled form.

If desired, there may be an inner sheet consisting of a wax paper but it has been found most satisfactory to apply to the surface of the complete tape a light surface of paraffin wax or silicone oil or even a polyethylene condensate such as carbowax which will prevent any adherence between the rubber pressure sensitive adhesive and the effective surface of the insecticidal repellent tape.

In any case, the layer of paraffin wax or silicone oil should be very thin so as not to affect the slow seepage or discharge of the residual from the body of the tape.

The tape thus formed should desirably have a thickness not exceeding about $1/64$ inch and if desired, the edges of the tape may be pressure sealed together by heavy pressure rollers so that the only release will be achieved in the central portion of the tape on the top side opposite the pressure sensitive adhesive side.

By suitably protecting the tape in this manner, it is possible to avoid causing any sensitivity or irritability as to the skin of the user, or as to anyone who may be handling the tape as to shipping, merchandising or retailing.

Yet, when the tape is applied and the insecticidal solution applied thereto, the slow release through the vinyl or polyethylene coating will permit most satisfactory insect repellent properties over a period which may range from one month up to six months or longer.

Normally, the pressure sensitive adhesive coating will become ineffective as an adhesive before the residual effect is lost, and the tape will be removed because of soiling or curling or failure of attachment.

It has been found that such a tape when applied around cracks, corners or crevices will repel roaches, ants, silverfish and similar insect life without necessarily killing the same, so that the area is quickly freed of infestation.

The essential feature of the present invention resides in the provision of absorbent felted tape saturated with an emulsion of the residual with the water removed and with the residual being present throughout the absorbent felt structure, an amount ranging from 1 to 10% and desirably 2 to 5%.

An important feature is also to prevent any destruction of the residual or contamination thereof by the pressure sensitive adhesive or the synthetic or natural rubber base therein. This is achieved by applying a relatively heavy barrier consisting of a flexible resin or varnish coating or impermeable paper or resin film lamination between the tape face or carrier and the pressure sensitive adhesive.

To assure slow release of the residual and retention thereof, a very light coat of a permeable resin is applied to the top surface of the tape which will result in a very slow release of the residual repelling the insect, but at the same time not causing any injury or sensitivity as far as the human body is concerned.

This will enable ready application of the tape by the housewife to cover any cracks, corners or crevices or places in and about the room, kitchen or other enclosure which is subject to insect entrance or infestation, followed by application of spray can insecticide thereto.

Desirably, the top surface may be combined with a material such as silicone oil or a light surface coating which will be readily separable from the pressure sensitive rubber adhesive coating.

BRIEF DESCRIPTION OF THE DRAWINGS

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a diagrammatic illustration of the coating procedure.

FIG. 2 is a diagrammatic section showing the various layers of the material which may form the final tape;

FIG. 3 is an alternative tape construction;

FIG. 4 is a top perspective view showing an alternative form of the invention where the insecticide material is carried in the form of tablets on a carrier tape without being dispersed or absorbed in the body thereof;

FIG. 5 is a diagrammatic perspective view of the corner of a room showing an alternative manner of applying the insecticide of the invention of the present application thereto;

FIG. 6 is a fragmentary perspective view of an alternative form of tape which may be applied as indicated in FIG. 5.

FIG. 7 is a side perspective view showing a spray can with a plastic top carrying a tape in the top.

FIG. 8 is a transverse fragmentary sectional view upon an enlarged scale as compared to FIG. 7 upon the line 8—8 of FIG. 7.

FIG. 9 is a transverse fragmentary horizontal sectional view of the slot and cutter upon the line 9—9 of FIG. 8.

FIG. 10 is a fragmentary transverse sectional view showing a form of tape having a felted top which may be used in FIGS. 7, 8 and 9 and readily breakable or cut to desired lengths by means of the slotted cutter of FIGS. 7, 8 and 9.

DESCRIPTION OF THE PREFERRED EMBODIMENTS

Referring to FIG. 1, the vessel 10 will contain an emulsion 11 of the residual in 3 to 10% strength and the paper tape 12 is guided into this bath by the rollers 13, 14, 15 and 16. The paper tape will then pass through the drying chamber 17 to be subjected to blasts of warm air or to infrared lamps which are indicated at 18.

This chamber may be omitted if desired, and the paper passed directly into a container 19 containing a wettable powder. The tape will be guided through this chamber by means of the rollers 20, 21, 22 and 23 and with or without partial drying in the drying chamber 17.

The paper will be thoroughly dried in position 24. It is then subjected to a roller coating operation which will coat the underside with a barrier resin.

As shown, the vessel 25 contains the barrier resin indicated at 26, and the paper will be passed through the rollers 27 and 28 and will pick up an under surface of the barrier and which may be dried in position in the drying chamber 29.

The drying in the drying chambers 17 and 29 is so regulated that there will be no substantial loss of the residual and a quick pass over infra-red lamps may be used to achieve this.

The paper, then in dry condition, will pass through the vessel 31 thereto by the rollers 32, 33, 34, and 35, where it will pick up a light surfacing which will act to protect the paper and permit only slow release of the residual material from the tape.

Finally, after drying of this additional resinous material in the chamber 36, the tape will be subjected to a final roller cutting operation in which the adhesive 37 will be applied by the roller 38 as the tape is passed under the roller 39.

The guide rollers 40 and 41 will guide it though the rubber sensitive adhesive coating. It may then be passed through a final drying operation, rolled up and used.

In FIG. 2 is shown a basic tape structure in side section.

The paper or absorbent material 50 carried in saturated form 2 to 10% of the residual material. It has an under layer of a barrier resin 51, and a base surface 65 of the rubber pressure sensitive adhesive.

The top face as well as the side faces will be covered by a light permeable resinous facing 53 which will act to slow the release of the residual and also act to protect the skin of the user.

If desired, there may be a light coating or face 54 of a material which will permit the face 54 to be in contact with the pressure sensitive adhesive 65 and be readily separable therefrom when the material of FIG. 2 is put up in rolled form and then is unrolled.

In FIG. 3 is shown an alternative tape structure in which there are two base layers 60 and 61. The top base layer may be of a nonpermeable sheet plastic material such as cellophane. However, in the desired form of the invention both base tape material 60 and 61 are formed of the absorbent material of paper which has been saturated with the residual.

Between the layers 60 and 61 there is positioned a wettable powder which may consist of an inert material such as talcum in the amount of 80 to 85% having absorbed thereon a small amount of the residual or other insecticidal material.

These two sheets of paper are then substantially permanently joined together by the fine perforations indicated at 63.

Where the upper layer 61 is the protective plastic, the coating may be avoided and the residual can be slowly released from the wettable powder 62 and from the lower saturated base tape 60.

However, where both tapes 60 and 61 are saturated with the residual oil, it is desirable to apply a coating such as 53 as in FIG. 2 to assure a slow release. The barrier layer 64 and the pressure sensitive adhesive layer 65 may be applied in the same manner as shown in FIG. 2.

In FIG. 3, the principal variation consists of the possibility of also utilizing a powder in between the layers 60 and 61 and the possibility of using a top surfacing which will assure slow release through the pin holes or perforations 63.

Where there is no reaction or interaction between the pressure sensitive adhesive 65 and the residual material saturated on the tape material 50 and 60, it is possible to eliminate the barrier 51 and 64, but generally the rubber of most pressure sensitive adhesives will absorb or undesirably affect the residual.

It is thus apparent that the present invention provides a readily applicable durable tape which may be applied either by the housewife or exterminator in and about the kitchen or other rooms to prevent infestations and to repel nondesirable insect life.

By use of a slow release, maximum value is obtained from the residual material in repelling the insect life and in protecting the hands and body portion of the user.

The tape will avoid the applying of injurious dust or sprays in or about living rooms or in rooms where food is prepared or eaten and eliminate any tendency of contamination of person's foodstuffs with sprays, aerosols or liquids.

The residual will be released at such a rate that it will repel the undesirable insect life for long periods of time as long as the tape is in usable condition.

The tape may be readily utilized in kitchens, food processing plants and the like without special precautions, and it is always readily available and may be used in the desired points of entry of insect life without waste of insecticide materials over large areas.

One of the most valuable residuals, which will be absorbed and effective for about 3 to 7 months, is Decapthon (O-(2-isopropyl-6-methyl-4-pyrimidinyl) phosphorothioate) which comes as an oily concentrate and which emulsifies in water in the proportion of 1 part of the oily concentrate to 20 to 30 parts of water.

By using a tape, yellow staining is prevented.

As an alternative it is possible to roller impregnate a strip of material so that the residual is first added over the entire area of the absorbent tape or strip material and then a central portion or strips may be impregnated with an attractant material which will draw the roaches or other insects to the impregnated peripheral or edge portions to cause lethal contact.

As attractants, it is possible to use hygroscopic sugar or glucose solutions or molasses or residual solution containing sugar. It is also possible to use Dipterex (O.O-dimethyl-2,2,2-trichloro-1 hydroxy ethyl phosphonate) mixed with sugar.

With Decapthon, a most effective absorbent material is a crinkled absorbent paper devoid of sizing or finish.

By the surface coating, both the undesirable odor and the staining are eliminated.

As a covering for the absorbent material, it is also possible to use a perforated plastic strip of material as a covering. The plastic sheeting or strips would consist of polyethylene, polypropylene, vinyl chloride and/or acetate copolymer, cellulose acetate or butyrate, nylon or polyethylene terephthate (Mylar), which would be caused to adhere to the top surface of absorbent material which would not absorb or react with or polymerize with the residual insecticide.

The important feature of the present invention resides in the fact that an absorbent carrier in the form of a tape is employed, containing in saturation or near saturation a residual insecticide, with protection of the insecticide aginst the gummy adhesive and protection of the insecticide against undue loss by evaporation when in storage or through merchandising.

In the application to the absorbent tape a preferred residual is one having an oil or water base, carrying about 4 ounces to a gallon and of the nature of an oil emulsion or an oil solution, such as an emulsion or solution of chlordane, Diazinon, Entex, Korlan, Lindane, Malathion, Dieldrin, and Dicapthon. These are desirably applied in a water emulsion or oil solution containing between 2 and 10 ounces per gallon, and are applied by a spray or roller coating to the absorbent cellulosic or fibrous material, which can absorb up to 100 to 200% by weight of the residual insecticide material.

These absorbent tapes were actually tried in various restaurants and locations using both insect attractants and repellents, as well as insect killing agents and also using insect killing agents without attractants and without repellents depending upon the effect it is desired to achieve.

As typical of various constructions which were used and found to be quite satisfactory is an adhesive tape having a removable paper backing to expose the pressure sensitive adhesive, which tape consisted of an absorbent material which was impregnated with 1% of Diazinon. This tape was found to prevent entry of roaches and also served to kill any roaches which came in contact with or stepped upon the tape.

The same experiment was carried out with 2% of Dicapthon and equally good results were obtained. At the same time other experiments were carried out with tapes which were composed as above which contained as an attractant a dry sugar solution in amount equal to about ½% on each of the above tapes. There were found to be particularly effective in as much as the roaches were attracted to the tape and then destroyed as the result of contact with the tape.

The above materials Diazinon and Dicapthon are regarded as repellents since when the roaches contacted these materials they would usually withdraw or be repelled and die shortly thereafter or would refuse to come close to the tape and would not cross the same because of its insecticidal properties.

It is also possible to add solidified tablets of the insecticidal material to the tape in addition to or in lieu of the impregnated insecticide. These tablets may each be covered by a suitable protective material.

Referring to FIG. 4, there is shown an alternative form of tape having an absorbent or non-absorbent adhesive backing 301 and a protective strip 302. The strip 302 may be cut off to permit the pressure sensitive surface 301 to be applied against the wall or floor or a shelf where there is a likelihood of ingress of insects, particularly roaches.

The tablets 303 may be of various shapes, but they desirably consist of an insecticidal material such as above set forth, compressed with glucose and sucrose in the proportion of about 2 to 5% of the insecticidal material and the balance being glucose and sucrose, preferably in equal proportions.

Each tablet may be carried on an adhesive facing applied to the upper face 304 of the carrier strip 300, or they may have adhesive coatings on their lower face, as indicated at 305, to enable them to be firmly attached to the top face 304 of the carrier strip 300.

To protect the tablets 303 against deterioration during storage, shipment and merchandising, the entire strip of FIG. 4 may be lightly spread with a varnish or protective coating. As an alternative, the entire strip may be covered with a readily removable paper strip having an adhesive or cohesive coating.

In FIG. 5, is shown an alternative form of the invention in which the strips 325, 326, 327 and 328 are applied to the walls 329, 330 and the floor 331, where there is likelihood of ingress of insects, such as silverfish, roaches and the like through crevices at the corner 332 or at the meeting of the walls and the floor 333 and 334. In this case the strips have an absorbent carrier strip 300, as shown at 300 in FIG. 4, with an under-facing 301 of pressure sensitive adhesive, so that they may be readily mounted upon the walls or floors.

Then a formula of the type above described is spread upon them, as indicated at 335, having the press button 336, the strip being indicated at 337. The adhesive material 300 will pick up the residual insecticide composition and hold it for long periods of time, for example 30 to 90 days and as long as six months, thoroughly protecting the room, closet or chest of drawers, or wherever else the strips may be placed by the housewife. The same type of strip may also be applied to the strip of FIG. 4, where the material 300 is of absorbent nature, such as toweling.

Referring to FIG. 6, there is shown a strip which can be applied to the walls, floors or other places to be protected against ingress of insects or roaches, which in the preferred form has a top absorbent felted strip 350, an intermediate pressure sensitive adhesive strip 351 and a protective under-strip of impermeable paper or plastic 352.

As a typical formula that may be used for the strip 337, it is possible to employ:

| Active ingredients: | Percent |
|---|---|
| 0.0-diethyl 0(2-isopropyl-6-methyl-4-primidinyl thiophosphate | 0.500 |
| Pyrethrins | 0.100 |
| Technical piperonyl butoxide | 0.250 |
| Petroleum dist. | 96.150 |
| Inert ingredients: | |
| Propellant | 3.0 |
| Equivalent to (butyl carbityl) (6-propyl piperonyl) ether and 0.05% of related compounds | 0.20 |

This type of material will incidentally kill or repel roaches, water bugs, ants, silverfish and the like.

Another typical formula which may be used is:

| Active ingredients: | Percent |
|---|---|
| Pyrethrins | 0.037 |
| N-octyl bicycloheptane dicarboximide | 0.150 |
| 0.0 - diethyl 0-(2 - isopropyl - 4 - methyl - 6-pyrimidinyl), phosphorothioate | 0.500 |
| Petroleum distillates | 96.313 |
| Inert ingredients: Propellent | 3.000 |

This formula is particularly suitable for indoor and outdoor ants, roaches and insects.

Another formula is:

| Active ingredients: | Percent |
|---|---|
| Pyrethrins | 0.25 |
| Technical piperonyl butoxide | 1.00 |
| Technical methoxychlor | 2.00 |
| Petroleum distillates | 11.75 |
| Inert ingredients | 85.00 |

Still another formulation is:

| Active ingredients: | |
|---|---|
| 0.0 - diethyl 0-(2 - isopropyl - 4 - methyl-6-pyrimidinyl) phosphorthioate | 00.50 |
| Pyrethrins | 00.08 |
| N-octyl bicycloheptene dicarboximide | 00.25 |
| Technical piperonyl butoxide | 00.15 |
| Petroleum distillates | 74.02 |
| Inert ingredients: Propellent | 25.00 |

Another formulation for ratches, waterbugs, crickets, centipedes, ants, clover mites, springtails, book lice, boxelder bugs, sow bugs, flies, mosquitoes, gnats, wasps, flying moths, mud daubers, scorpions, spiders, silverfish, firebrats, carpet beetles and dog ticks is the following:

| Active ingredients: | Percent |
|---|---|
| 0.0-dimethyl-0,2,2,-dichlorovinyl phosphate | 0.186 |
| Related compounds | 0.014 |
| Dieldrin | 0.300 |
| Petroleum distillates | 96.500 |
| Inert ingredients | 3.000 |
| | 100.000 |

Still another composition is the following:

| Active ingredients: | |
|---|---|
| DDVP | 0.50 |
| Dieldrin | 0.50 |
| Petroleum distillate | 96.50 |
| Inert ingredients | 2.50 |
| | 100.00 |

Finally, another mixture is:

| Active ingredients: | Percent |
|---|---|
| Dichloro-diphenyl-trichloroethane | 5.0 |
| Methylated naphthalenes | 8.5 |
| Beta butoxy, beta thiocyanodiethyl ether | 1.0 |
| Essential oils | 0.5 |
| Petroleum distillates | 85.0 |
| | 100.0 |

Referring to the combination can and dispenser as shown in FIGS. 7, 8 and 9, the can 500 may have a bottom recess 501 to carry the tape, but preferably it is carried in the cap 502. The cap 502 has a base 503 with a depending outer skirt 504 and a depending inner skirt 505. The inner skirt 505 will fit around the spray valve control element 506 which projects upwardly from the top 507 of the can having the permanently applied top closures 508 joined to the side walls 509 of the cam by the beading 510.

The skirt 504 of the plastic top 501 has a shouldered lower edge portion 511 which rests on the beading 510 and a depending flange 512 which has indentations to engage and hold onto the bead 510.

The depending inside nipple 504 is slotted as indicated at 511 and it has the nipples or projections 512 to enable it to snap under the central core 513 of the spool 514. The spool 514 will carry the absorbent tape 515 which may or may not have been previously treated. This tape has a pressure sensitive adhesive base 516 as shown in FIG. 10 and a felted absorbent carrier strip 517 covered by the offsetting surfacing 518.

In between is the barrier layer 519 of an impermeable paper strip or plastic film strip.

The tape 515 will pass through the slot 520 in the side of the skirt 504 of the cap 501 which has the projecting rounded portions 521 and 522 for pressing the tape down after it has been applied with the saw or serrated edge 523, which can be used for ripping the tape or cutting it to desired lengths.

The tape spool 514 may be readily applied over the holder 505 and it will always be readily available and may be used in the manner indicated in FIG. 5, even though it may have been previously given an application which will give it residual insect properties. This integrated container structure for the tape, as shown in FIGS. 7 to 9 may be applied on the sides of the can or at the bottom of the can.

The serrated edge 523 may be replaced by a knife or cutter on the skirt 504 of the plastic cap so that there will be sufficient excess length of the tape available for grasping of the tape if desired.

The absorbent face 517 may consist of a deposit of absorbent granules, whether of charcoal or silica, which will absorb and slowly release the residual insecticide material.

The offsetting surfacing 518, while permitting separation of the adhesive base 516, will not prevent the absorbent material or layer 517, whether it be a felted material or a woven material or a knitted material or even a layer of granules, from becoming saturated with a spray material when a spray is applied thereto, or gradually releasing said spray for inserticidal purposes after it has been applied along the lower edges of the wall or against the floor adjacent to the wall to prevent ingress of insect life.

As many changes could be made in the above description of the invention, and many widely different embodiments of this invention could be made without departing from the scope of the claims, it is intended that all matter contained in the above description shall be interpreted as illustrative and not in a limiting sense.

The cap 501 may also be permanently attached to the top of the can with the spray device projecting upwardly therethrough, or it may be detachably attached to the bottom of the can or mounted encircling the side of the can.

Having now particularly described and ascertained the nature of the invention, and in what manner the same is to be performed,

What is claimed is:

1. In an insecticidal spray dispenser, said dispenser having a cylindrical can dispenser with a top closure attached thereto, having a top connecting bead, and a cylindrical spray dispenser head projecting upwardly from the top center of the closure; the combination therewith of an insecticidal adhesive tape dispenser comprising a top wall with outside and inside depending skirts, the outside skirt being larger than the inside and having a lower peripheral engagement for said top connecting bead, and said inside skirt fitting closely over and engaging said dispenser head, a roll of insecticidal tape positioned upon said inside skirt and a slot in said outer skirt for dispensing said tape.

2. The dispenser of claim 1, said tape having a top absorbent surface carrying a residual insecticidal compound, an intermediate barrier and a bottom pressure sensitive adhesive surfacing.

3. The dispenser of claim 1, said tape comprising an absorbent strip saturated with a residual insecticide applied to floors, walls and the like to exclude ingress of insect life, and having on its bottom face a rubber base pressure sensitive adhesive coating, and a barrier between the strip and the rubber base to prevent any interaction between the residual insecticide and the rubber base of the adhesive coating.

4. The dispenser of claim 1, said inside skirt being slotted so as to closely and frictionally fit over said dispenser head and having an encircling bead at the lower end thereof to hold said roll of tape in position.

5. The dispenser of claim 1, said slot being vertically positioned in the portion of the outside skirt adjacent the top wall and having outwardly extended serrated edges to enable ripping off of portions of said tape.

References Cited

UNITED STATES PATENTS 3,295,246   1/1967   Landsman et al. _____ 43—131

WALTER SOBIN, *Primary Examiner.*

U.S. Cl. X.R.

222—192, 394; 225—77; 206—47